United States Patent

Halabiya et al.

[11] Patent Number: 5,901,792
[45] Date of Patent: May 11, 1999

[54] VERTICALLY ADJUSTABLE HITCH

[75] Inventors: Sabah Halabiya, Rheinhausen; Milan Dimitrijevic, Mannheim, both of Germany

[73] Assignee: Deere & Company, Moline, Ill.

[21] Appl. No.: 08/986,175

[22] Filed: Dec. 5, 1997

[30] Foreign Application Priority Data

Jan. 25, 1997 [DE] Germany ............................ 197 02 700

[51] Int. Cl.⁶ ........................................................ E01D 1/00
[52] U.S. Cl. ............................................ 172/680; 280/186
[58] Field of Search ............................. 280/186; 172/680

[56] References Cited

U.S. PATENT DOCUMENTS

| | | | |
|---|---|---|---|
| 4,810 | 10/1846 | Sabin | 172/680 X |
| 278,710 | 6/1883 | Klugh et al. | 280/186 |
| 344,009 | 6/1886 | Rosenfield | 280/186 |
| 746,080 | 12/1903 | Higgins | 280/186 |
| 962,243 | 6/1910 | Reiter | 280/186 |
| 1,273,652 | 7/1918 | Olerich | 172/680 |
| 2,187,380 | 1/1940 | Kaltoft | 172/680 X |
| 2,652,552 | 9/1953 | Hueso | 280/186 X |
| 3,043,034 | 7/1962 | Kober | 172/680 X |
| 3,791,456 | 2/1974 | Koch | 172/680 X |
| 4,282,621 | 8/1981 | Anthony et al. | 280/186 X |

FOREIGN PATENT DOCUMENTS

| | | | |
|---|---|---|---|
| 0 294 509 | 12/1988 | European Pat. Off. . | |
| 515153 | 12/1930 | Germany | 172/680 |
| 891336 | 8/1953 | Germany | 172/680 |
| 29 10 164 | 9/1980 | Germany . | |
| 38 16 359 | 11/1989 | Germany . | |
| 221 | 3/1859 | United Kingdom | 172/680 |

*Primary Examiner*—Christopher J. Novosad

[57] ABSTRACT

A vertically adjustable hitch for an agricultural tractor includes a pair of guide rails and a retainer which moves up and down on the rails. A chain has fixed ends and a central region which engages a pair of pulleys which are rotatably mounted on the retainer. As the pulleys rotate, they roll along the chain and move the retainer. A drive mechanism is coupled to rotate at least one of the pulleys. A locking mechanism is releasably engageable with the chain to prevent movement of the retainer relative to the chain.

13 Claims, 2 Drawing Sheets

VERTICALLY ADJUSTABLE HITCH

BACKGROUND OF THE INVENTION

The invention relates to a vertically adjustable hitch for an agricultural tractor, wherein the hitch includes a retainer which is guided vertically and which can be locked.

DE-OS-29 10 164 discloses a trailer coupling for agricultural tractors. The coupling consists of a coupling socket and a support plate rigidly connected thereto, which is guided between two perforated rails fastened to the tractor and can be positioned vertically and can be locked in various positions by means of a pin penetrating the perforated rails and the support plate. Due to the relatively large weight of the trailer coupling, the trailer coupling is supported by two compression springs with a particular spring characteristic.

DE-A1-38 16 359 discloses a trailer coupling for agricultural vehicles that can be infinitely variably adjusted in height by means of a power drive consisting of two piston and cylinder arrangements. To position the trailer coupling, the vehicle drive must be operating so that the piston and cylinder arrangement can be supplied with operating pressure.

The European patent application EP-A1-0 294 509 also discloses a trailer coupling that can be adjusted in height with a coupling support that can be positioned by means of a spindle and nut drive. This configuration is costly to manufacture and requires frequent servicing of the spindle and nut drive.

SUMMARY OF THE INVENTION

Accordingly, an object of this invention is to provide a low cost robust hitch which can be vertically adjusted with little applied power, even with the vehicle drive stopped.

These and other objects are achieved by the present invention, wherein a vertically adjustable hitch includes guide elements fastened to the vehicle, which guide a retainer which can be positioned vertically and can be locked. A chain is secured to the vehicle or to the guide element. The central part of the chain engages a pair of pulleys mounted for rotation on the retainer, so as to roll and be locked in friction or in positive engagement. A rotary drive is provided to rotate at least one of the pulleys which engage the chain. With this mechanism the hitch height can be adjusted without applying a large amount of force. A separate drive is therefore not required, but may be applied if desired. The hitch is robust and not prone to malfunction. It can be manufactured at low cost using commercially available components. Preferably, the central region of the chain is flexible and is wrapped at least partially around the outer surface of at least one of the pulleys so that relatively large forces can be transmitted between the chain and the pulley. The chain is wrapped in opposite directions around two pulleys resulting in a secure guidance of the chain. To assure smooth running of the chain without the danger of jamming or twisting, the pulleys should lie in approximately one plane and their axes of rotation should be approximately parallel. Preferably, the pulley that is closer to the upper region of the chain is located at a lower position on the retainer than the pulley lying closer to the lower region of the chain, so that a portion of the puleys are in contact with the chain envelops. This makes possible a positive lock between the pulleys and the chain. At least one of the pulleys is provided with teeth or projections that can engage in or between the links of the chain.

The two guide rails are arranged vertically and parallel to each other, to permit vertical movement of the retainer therebetween without twisting. In order to obtain a relative movement of the retainer with respect to the guide element, one end of the chain is secured to an upper end of one guide rail and the other end of the chain is attached to a lower end of the other guide rail. The ends of the chain are configured as eyelets for ease of attachment to and removal from the guide rails. A locking arrangement can be provided to secure the retainer with respect to the guide element at various positions in height. Preferably, the locking arrangement is a movable lock-bar that can be brought to one of two end positions. In its first, extended position, it engages between the links of the chain and thereby locks it. In its second, retracted position it no longer engages the links of the chain and thereby permits movement of the retainer with respect to the chain. A crank can be attached to one of the pulleys and driven manually or by means of a motor.

DETAILED DESCRIPTION

Figure 1:
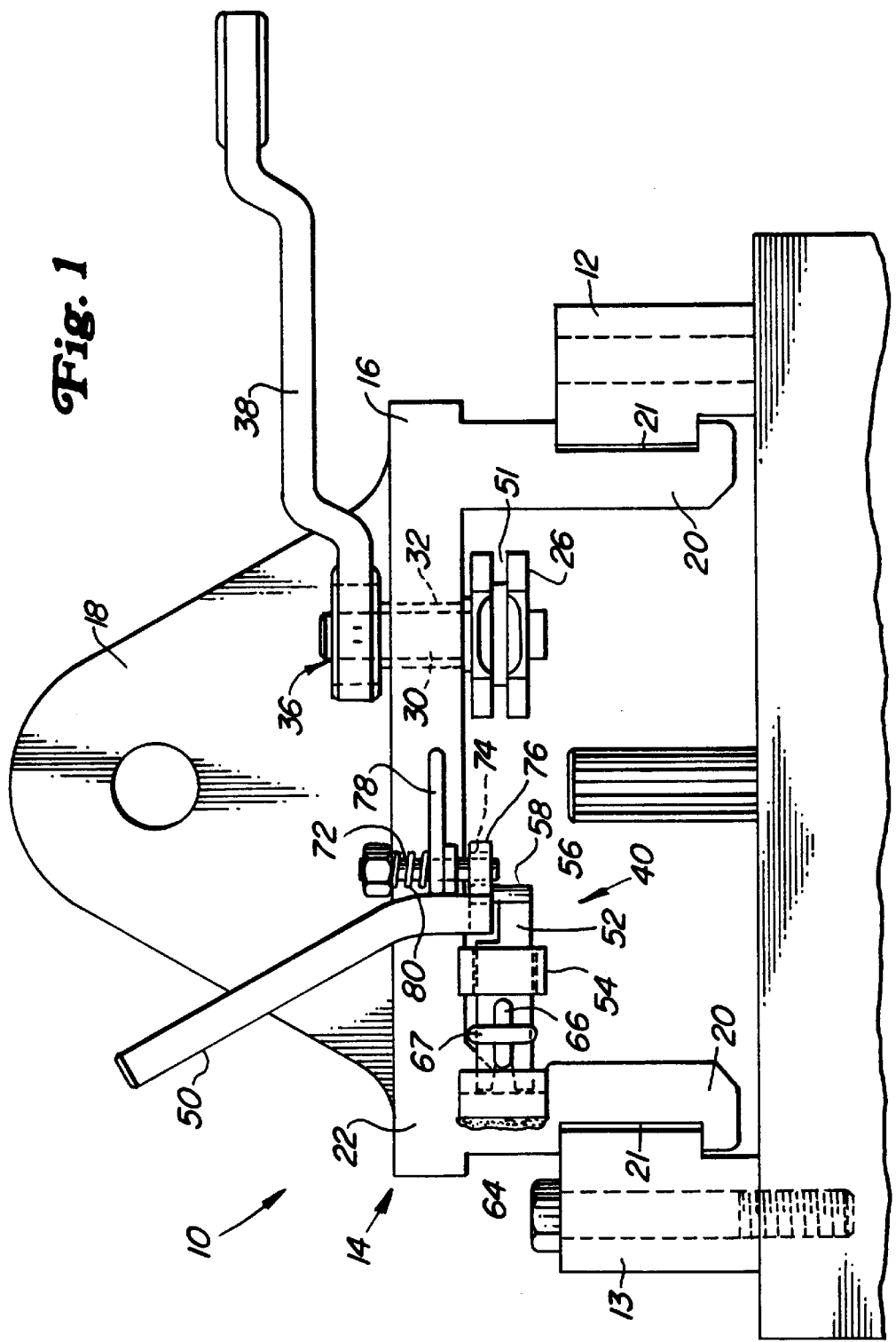
FIG. 1 shows a top view of a vertically adjustable hitch according to the invention.

FIG. 1 shows a hitch 10 for the attachment of implements and the like to an agricultural vehicle, preferably a tractor (not shown). Two guide rails 12, 13 are bolted to the rear frame 11 of the tractor. A retainer 14 is guided, so as to move vertically, between these guide rails 12, 13. The retainer 14 consists of a U-shaped bridge 16 to which a hitch tongue 18 or another element for the hitching of an implement or a trailer is attached.

The U-shaped bridge 16 consists of two legs 20 that contain vertical recesses 21 which slidably receive the guide rails 12, 13. A plate 22 extends between the legs 20 and two hexagonal pulleys 26, 28 are rotatably attached for rotation on the forward side of plate 22. Instead of the hexagonal pulleys 26, 28, pulleys with more or fewer side surfaces could also be used. The first pulley 26 is supported, fixed against rotation, on a pin 30 which extends through a bore 32 in the plate 22. On the rear side of the plate 22 a nut 36 is attached to the pin 30, fixed against rotation. A box wrench 38 can be applied to the nut 36 in order to rotate the first pulley 26. The second pulley 28 is rotatably attached to the plate 22 by a further pin.

Figure 2:
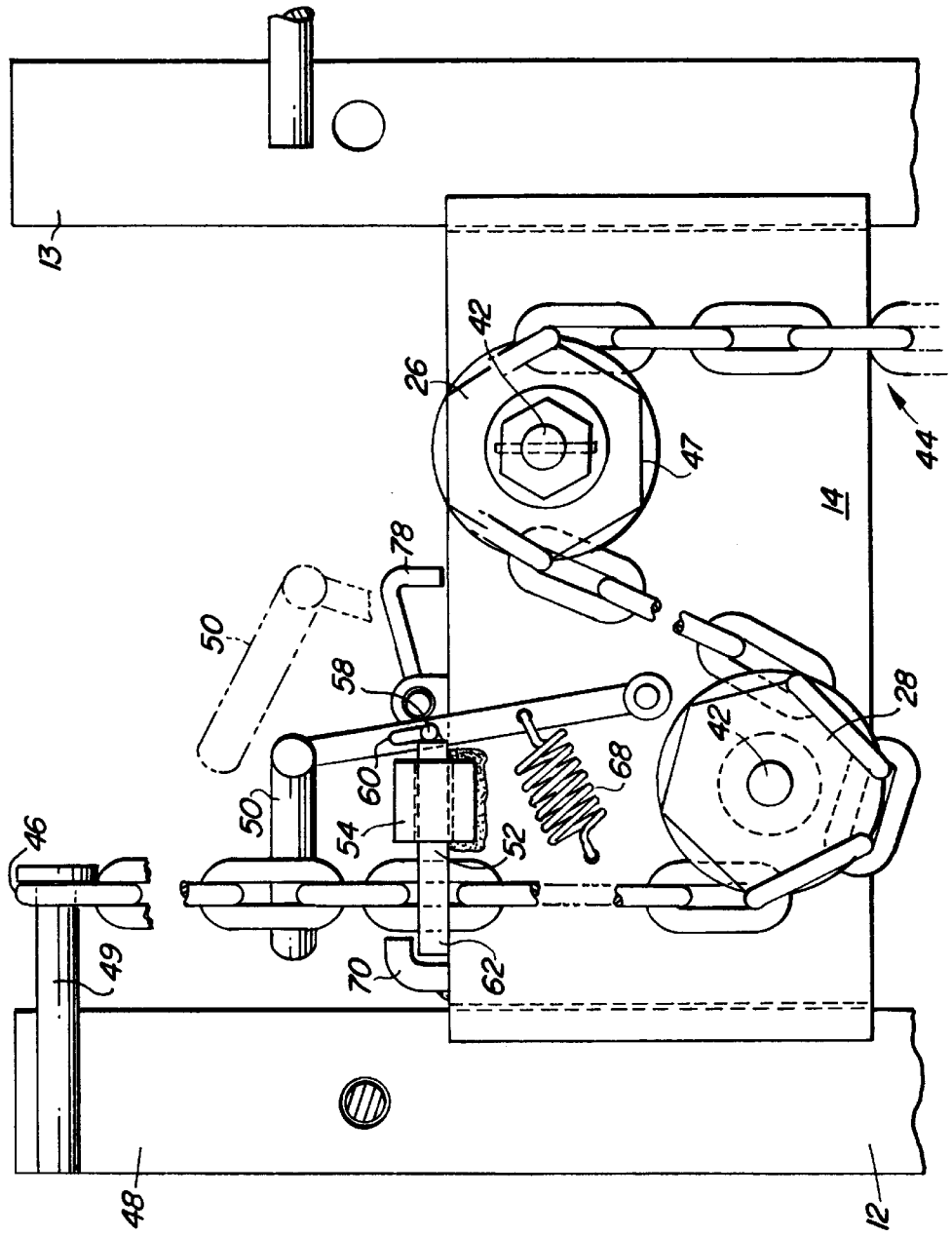
FIG. 2 shows a view of the hitch of FIG. 1 viewing towards the rear.

A locking arrangement 40 is mounted on the bridge 16. Referring now FIG. 2, the two hexagonal pulleys 26, 28 are spaced apart both horizontally and vertically. The distance between the centers 42 of the two pulleys 26, 28 in the horizontal direction corresponds approximately to 1.5 times the pulley diameter and in the vertical direction to approximately the pulley diameter. A chain 44 (not shown in FIG. 1 for the sake of clarity) is wrapped around the two pulleys 26, 28. One end 46 of the chain 44 is fastened to an upper region 48 of the first guide rail 12. The other end (not shown) is preferably attached to a lower region of the second guide rail 13. The end 46 of the chain 44 is configured as an eyelet. This end 46 is connected by means of a socket pin 49 to the first guide rail 12 so that it can easily be removed. Starting from its lower end the chain 44 extends over the upper side of the first pulley 26 and is wrapped around the second pulley 28 on its lower side. The chain 44 consists of successive approximately oval links which are offset by 90 degrees with respect to each other.

The pulleys 26, 28 include a circumferential slot 51 which receives alternate links of the chain 44 and thereby guides the chain 44. The remaining links are engageable with the outer peripheral surfaces 47 of the pulleys 26, 28 and provide transmission of force between the pulleys 26, 28 and the chain 44.

A handgrip 50 is rotatably attached near the center of the plate 22. A downward opening U-shaped retainer 54 is permanently connected to the upper part of plate 22. Retainer 54 slidably receives and guides a lock-bar 52. A pin 58 is fixed to the first end 56 of lock-bar 52 and is received in an elongated hole 60 in the handgrip 50. Thereby the lock-bar 52 can be moved back and forth in horizontal direction by means of the handgrip 50. The lock-bar 52 has a second end 62 which faces the chain 44 and which includes a vertical slot 64 which extends in the direction of its longitudinal centerline to approximately the center of the lock-bar 52. The slot 64 is therefore capable of receiving alternate links 66 of the chain 44, and the portions of the lock-bar 52 on either side of the slot 64 are engageable with the other links 67 of the chain 44 to prevent downward movement of the plate 22.

A spring 68 has one end fastened to the handgrip 50 and the other end to the plate 22. Spring 68 urges the handgrip 50 towards the chain 44 so that the lock-bar slot 64 receives a link of the chain 44 and so that the end 62 of the lock-bar 52 engages a hook-shaped retainer 70 which is fastened to the plate 22. This prevents movement of the bridge 16 relative to the guide rails 12 and 13.

If the handgrip 50 is moved away from the chain 44 against the force of the spring 68, then the slot 64 in the lock-bar 52 releases the chain 44. The upper pulley 26 can then be rotated with very little force by means of the box wrench 38. Additional support of the retainer 14 can be supplied by the handgrip 50.

A horizontally movable pin 72 is mounted on the upper surface of the plate 22. When the lock-bar 52 is in a position to prevent movement of the bridge 16, then the pin 72 is received in a bore 74 in a plate 76 that is rigidly attached to the handgrip 50. The pin 72 can be moved out of bore 74 against the force of a spring 80 by means of a handgrip 78 to thereby permit movement of the lock-bar 52. The spring 80 automatically moves the pin 72 into the bore 74 as soon as the handgrip 78 is released to prevent unintentional release of the bridge 16.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A vertically adjustable hitch for an agricultural vehicle, the hitch having a pair of guide elements attached to and fixed relative to the vehicle which guide a retainer which can be positioned vertically and locked, characterized by:
    an elongated flexible member having one end fixed to one of the guide elements and having a second end fixed to the other of the guide elements, and having a central portion extending therebetween;
    at least one pulley rotatably mounted on the retainer and engaging the central portion of the flexible member; and
    a rotary drive device coupled to the pulley for rotating the pulley and moving the retainer relative to the guide elements.

2. The hitch of claim 1, wherein:
    the central portion of the flexible member is wrapped at least partially around the at least one pulley.

3. The hitch of claim 2, wherein:
    a pair of pulleys are mounted on the retainer, the pulleys lying in one plane and having parallel axes of rotation; and
    the flexible member is wrapped in opposite directions around both pulleys.

4. The hitch of claim 3, wherein:
    a first one of the pulleys is located closer to one end of the flexible member and a second one of the pulleys is located closer to the other end of the flexible member, and the first pulley located below the second pulley.

5. The hitch of claim 1, wherein:
    the flexible member comprises a chain having links which engage the pulley.

6. The hitch of claim 5, wherein:
    one end of the chain is configured as an eyelet which can be hooked onto a pin which projects from one of the guide elements.

7. The hitch of claim 5, further comprising:
    a locking device for preventing relative movement between the retainer and the guide elements.

8. The hitch of claim 7, wherein the locking device comprises:
    a lock-bar mounted on the retainer and movable between a lock position wherein it engages the chain and a release position wherein it is disengaged from the chain.

9. The hitch of claim 1, wherein:
    the guide elements comprise a pair of parallel vertically extending guide rails, one end of the flexible member being fastened to an upper end of the one of the guide rails and the other end of the flexible member being fastened to a lower end of the other guide rail.

10. The hitch of claim 1, wherein:
    the rotary drive device comprises a handle for manipulation by an operator.

11. A vertically adjustable hitch for an agricultural vehicle, the hitch having guide elements attached to the vehicle which guide a retainer which can be positioned vertically and locked, characterized by:
    an elongated flexible member having ends which are fixed, and a central portion extending therebetween;
    at least one pulley rotatably mounted on the retainer and engaging the central portion of the flexible member; and
    a rotary drive device coupled to the pulley for rotating the pulley and moving the retainer relative to the guide elements, the guide elements comprising a pair of parallel vertically extending guide rails, one end of the flexible member being fastened to an upper end of the one of the guide rails and the other end of the flexible member being fastened to a lower end of the other guide rail.

12. A vertically adjustable hitch for an agricultural vehicle, the hitch having guide elements attached to the vehicle which guide a retainer which can be positioned vertically and locked, characterized by:
    an elongated flexible member having ends which are fixed, and a central portion extending therebetween;
    at least one pulley rotatably mounted on the retainer and engaging the central portion of the flexible member, the flexible member comprising a chain having links which engage the pulley; and
    a rotary drive device coupled to the pulley for rotating the pulley and moving the retainer relative to the guide elements, and one end of the chain being configured as an eyelet which can be hooked onto a pin which projects from one of the guide elements.

13. A vertically adjustable hitch for an agricultural vehicle, the hitch having guide elements attached to the vehicle which guide a retainer which can be positioned vertically and locked, characterized by:

an elongated flexible member having ends which are fixed, and a central portion extending therebetween;

at least one pulley rotatably mounted on the retainer and engaging the central portion of the flexible member, the flexible member comprising a chain having links which engage the pulley;

a rotary drive device coupled to the pulley for rotating the pulley and moving the retainer relative to the guide elements; and a locking device for preventing relative movement between the retainer and the guide elements, the locking device comprising a lock-bar mounted on the retainer and movable between a lock position wherein it engages the chain and a release position wherein it is disengaged from the chain.

* * * * *